(12) United States Patent
Christie et al.

(10) Patent No.: US 7,449,262 B2
(45) Date of Patent: Nov. 11, 2008

(54) CURRENT COLLECTOR TO CONDUCT AN ELECTRICAL CURRENT TO OR FROM AN ELECTRODE LAYER

(75) Inventors: Gervase Maxwell Christie, Buffalo, NY (US); Jonathan Andrew Lane, Snyder, NY (US)

(73) Assignee: Praxair Technology, Inc., Danbury, CT (US)

(*) Notice: Subject to any disclaimer, the term of this patent is extended or adjusted under 35 U.S.C. 154(b) by 30 days.

(21) Appl. No.: 11/007,220

(22) Filed: Dec. 9, 2004

(65) Prior Publication Data

US 2006/0127749 A1   Jun. 15, 2006

(51) Int. Cl.
   *H01M 4/64*   (2006.01)
   *H01M 4/66*   (2006.01)
   *H01M 4/86*   (2006.01)

(52) U.S. Cl. ............... 429/45; 429/44; 429/122; 427/115

(58) Field of Classification Search ............. 429/30
   See application file for complete search history.

(56) References Cited

U.S. PATENT DOCUMENTS

| | | | |
|---|---|---|---|
| 4,361,631 A * | 11/1982 | Iacovangelo et al. | 429/40 |
| 4,725,346 A | 2/1988 | Joshi | 204/242 |
| 4,810,529 A | 3/1989 | Mantese et al. | 427/123 |
| 4,879,016 A | 11/1989 | Joshi | 204/242 |
| 5,616,437 A * | 4/1997 | Gao | 429/245 |
| 5,716,552 A | 2/1998 | Paszkiet et al. | 252/514 |
| 6,203,676 B1 | 3/2001 | Phillips et al. | 204/256 |
| 6,475,657 B1 * | 11/2002 | Del Gallo et al. | 429/30 |
| 6,517,931 B1 | 2/2003 | Fu | 428/210 |
| 2002/0098404 A1 * | 7/2002 | Shibata et al. | |
| 2004/0069655 A1 * | 4/2004 | Chaput et al. | 205/765 |
| 2005/0109617 A1 * | 5/2005 | Ono et al. | 204/400 |
| 2005/0196657 A1 * | 9/2005 | Sarkar et al. | 429/31 |

FOREIGN PATENT DOCUMENTS

JP   2004-165074   *   6/2004

* cited by examiner

*Primary Examiner*—Jonathan Crepeau
*Assistant Examiner*—Tony Chuo
(74) *Attorney, Agent, or Firm*—David M. Rosenblum

(57) ABSTRACT

A current collector and method of forming the same in which a slurry is prepared that contains electrically conductive particles having surface deposits of a metallic oxide on a metal or metal alloy conductor that has a lower weight percentage of the electrically conductive particles than the metal or metal alloy. The slurry is applied to a structure that contains an electrolyte and electrode layers. The resultant coated form is then fired to partly sinter the electrically conductive particles and thereby to obtain porous current collector layers affixed to the electrode layers. The current collector of the present invention is between about 5 microns and about 100 microns thick and preferably has a porosity of between about 10 percent and about 70 percent with pores having a pore size of between about 0.1 microns and about 20 microns.

7 Claims, 3 Drawing Sheets

CURRENT COLLECTOR TO CONDUCT AN ELECTRICAL CURRENT TO OR FROM AN ELECTRODE LAYER

FIELD OF THE INVENTION

The present invention relates to a method of manufacturing a current collector and the current collector itself in which the current collector is formed as a porous layer in contact with an electrode of an electrochemical air separation device to conduct an electrical current. More particularly, the present invention relates to such a method and current collector in which the current collector is formed of electrically conductive particles having a surface deposit of a metallic oxide.

BACKGROUND OF THE INVENTION

Electrochemical devices for separating oxygen from air all utilize one or more electrochemical air separation elements formed of an electrolyte layer sandwiched between one or more electrode layers. Such devices include oxygen concentrators, hydrolyzers and fuel cells.

The electrolyte is capable of conducting oxygen ions at elevated temperatures. Typical materials used in forming the electrolyte include yttria stabilized zirconia and gadolinium doped ceria. The electrode layers serve to conduct electrons and act as a cathode and an anode for the air separation element. The cathode electrode conducts electrons to ionize the oxygen and the anode electrode conducts electrons that are produced by recombination of the oxygen ions into elemental oxygen. In case of an oxygen concentrator or hydrolyzer, the oxygen ion transport is driven by an external electric current impressed on the electrodes. In a fuel cell, the oxygen ion transport is driven by an oxygen partial pressure differential produced by the combustion of fuel supported by the permeated oxygen. The electrode layers are porous to permit oxygen diffusion to and from the electrolyte and are typically fabricated from metals, metallic oxides or mixtures of the same.

In order to connect the electrode to an external current source in case of an oxygen concentrator or to a load in case of fuel cell, porous current collector layers are disposed on the electrode layers. The current collector distributes current evenly throughout the electrode surface so that the entire electrode surface is active. A typical material that is used for a current collector is silver. The current collector layers are applied to the electrode layers in a green state by a variety of different methods including slurry dip coating, spraying and isopressing. The green form is subjected to a heat treatment in which additives such as binders and fugitive pore formers, when used, are burned out and the silver particles partly sinter into a coherent mass so that the coherent mass has a porous structure. Typically, the yield of pores is low due to the sintering because as the sintering process proceeds any pores that have been formed are eliminated due to densification of the mass. Moreover, during use of the electrochemical air separation element, further pore closure occurs. As can be appreciated, the closure of the pores decreases the performance of the element because the oxygen has to diffuse through the current collector rather than through pores formed in the current collector. Furthermore, the conductive metal, for instance silver, tends to evaporate during use which decreases longevity of the device. A yet further problem is that it is difficult to maintain the current collector affixed to the electrode for any length of time.

In an attempt to solve problems such as pore closure and aging due to evaporation, U.S. Pat. No. 6,457,657 discloses a method of fabricating a current collector that employs an even mixture of a conductive metal, for example, silver and a metallic oxide, for instance, an 8 percent yttria stabilized zirconia. The metallic oxide tends to prevent the closure of the pores. A layer of a metallic oxide is added over the current collector to prevent aging of the device due to evaporation of the silver. The problem with a current collector formed by an even mix of a conductor and a metallic oxide is that the metallic phase, for instance, silver, will tend to more readily sinter than the metallic oxide. As a result, a high proportion of the silver is exposed and will have a high degree of interparticle contact to decrease the yield of pores during manufacture and the maintenance of pores during operational use. Furthermore, the high concentrations of metallic oxides tend to reduce the conductivity of the current collector.

As will be discussed, the present invention provides a method of manufacturing a current collector that utilizes metallic oxides in a more effective manner than the prior art to increase the yield and longevity of open pores and that also increases the adhesion of the current collector to an electrode.

SUMMARY OF THE INVENTION

The present invention relates to a method of forming a porous current collector layers on electrode layers of an electrochemical air separation element. In accordance with the method, a slurry is prepared that contains electrically conductive particles that are formed of a metal or metal alloy and a metallic oxide surface deposit on the metal or metal alloy. The metallic oxide surface deposit constitutes a lower weight percentage of the electrically conductive particles than the metal or metal alloy. The slurry is applied to opposite electrode surfaces of the electrode layers of a layered structure having an electrolyte layer located between the electrode layers. The layered structure is then fired after having applied the slurry at a temperature above intended operational temperatures of the electrochemical air separation element and so that at least the electrically conductive particles partly sinter and thereby form porous current conductor layers on the opposed electrode surfaces. It is to be noted that the term "slurry" as used herein and in the claims means any liquid suspension of the electrically conductive particles. For instance, if the slurry is applied by way of dip coating, the electrically conductive particles will be suspending in a mixture containing a solvent, binders, perhaps plasticizers and dispersants. The slurry can also be applied by other methods such as spraying and in such case, the slurry consists of the electrically conductive particles suspended in a solvent.

After deposition of the slurry and subsequent removal of any binder, solvent, plasticizer or dispersant, the particles that comprise the current collector are loosely bound together and poorly adhered to the electrode. The layer has little, if any, mechanical integrity and is easily removed. In order to consolidate this layer, that is, to increase the mechanical integrity and adherence, it is normal practice to subject the layer to an additional heat treatment at a temperature higher than the temperature at which the device is designed to be used, typically, about 700° C. The problem is that this additional heat-treatment generally results in sintering and densification of the current collector. Densification implies the elimination of porosity in that layer and open porosity is a fundamental requirement for high performance device operation. This is especially a problem when forming silver current collectors as silver sinters and densities very readily.

It is well accepted that the driving force for densification of a powder compact is the decrease in surface area and lowering of surface energy of the particles in that compact by the elimination of solid-vapor interfaces, for instance, pores. The elimination of solid-vapor interfaces, or pores, occurs by material transport from high surface energy regions such as the curved surfaces of particles to low energy regions where the particles are in intimate contact. This process is also known as "necking". Common mechanisms by which the material transport occurs are surface diffusion, grain boundary and lattice diffusion and vapor transport (evaporation-condensation). Without being held to any specific theory of operation it is believed that the diffusion coefficients and vapor pressures for metal oxides are orders of magnitude lower than diffusion coefficients metals. In this regard, silver in particular has very high vapor pressures and diffusion coefficients. By placing a thin layer of metal oxide at the silver particle surface the driving force for densification and consequent pore elimination is decreased by retarding the processes of vapor transport and surface diffusion. In doing so, the current collection layer is able to be fired at a temperature greater than that which it is designed for use while providing mechanical integrity. The densification process, is, however, retarded to such an extent that the residual porosity of the layer remains high.

In the prior art, particular in case of a current collector formed of silver alone, but also probably, even where a metallic oxide is mixed with the silver or other metal conductor, there are many silver-silver contacts and a large amount of silver-vapor interfaces therefore a high driving force for densification. It is believed, however, that in the present invention the solid-vapor interfaces and solid-solid particle contacts are predominantly the metallic oxide, for example zirconia. As such, the driving force for densification is lowered dramatically. It is important that this surface deposit remains thin in order to maintain a high electrical conductivity in the layer. It is also believed that the metallic oxide bonds to electrodes formed of a perovskite, for example, lanthanum strontium cobalt iron oxide, to create better adhesive properties than the prior art.

The metallic oxide can be $ZrO_2$, $CeO_2$, doped-$ZrO_2$, doped-$CeO_2$, $Y_2O_3$, $Al_2O_3$, $Cr_2O_3$, $MoO_3$, $Nb_2O_5$, $TiO_2$, $Ta_2O_5$, $SnO_2$, $La_{0.6}Sr_{0.4}Co_{0.2}Fe_{0.8}O_3$, $La_{0.8}Sr_{0.2}MnO_3$, $La_{0.8}Sr_{0.2}FeO_3$, $La_{0.8}Sr_{0.2}CrO_3$, or $La_{0.8}Sr_{0.2}CoO_3$. The metal or metal alloy can be formed from Ag, Au, Pd, Pt, Ni, Ru, Rh, Ir, or alloys thereof.

Preferably, the electrically conductive particles are formed from silver particles having surface deposits of $ZrO_2$ or $CeO_2$. The slurry can be applied by dip coating although there are other possibilities that will be discussed. Further, the layered structure can be in a sintered state prior to the application of the slurry.

The electrically conductive particles can be between about 45 percent and about 75 percent by weight of the slurry and have a particle size of between about 0.1 and about 20 microns and the surface deposit of the metallic oxide is between about 0.02 percent and about 10 percent by weight of said particles. More preferably, the metallic oxide surface deposit is between about 0.05 percent and about 1.0 percent by weight of the electrically conductive particles. Even more preferably, the metallic oxide surface deposit is about 0.25 percent by weight of the electrically conductive particles. In a particularly preferred embodiment, the electrically conductive particles are silver, have a particle size of between about 3 and about 10 microns and a specific area of about 0.2 $m^2$/gram.

In another aspect, the present invention provides a current collector to conduct an electrical current from or to an electrode layer of an electrochemical device. In accordance with this aspect of the present invention, the current conductor comprises a porous layer in contact with and affixed to said electrode layer. The porous layer is formed of a partially sintered mass of granular, electrically conductive particles that are composed of a metal or metal alloy having surface deposits of a metallic oxide. The surface deposits of the metallic oxide constitute a lower weight percentage of the electrically conductive particles than the metal or metal alloy. The porous layer can have a thickness of between about 5 microns and about 100 microns, a porosity of between about 10 percent and about 70 percent and pores having a pore size of between about 0.1 microns and about 20 microns. It is to be noted that the term "pore size" as used herein, further in the specification and in the claims means average pore diameter as determined by quantitative stereological line intersection analysis, a technique well known in the art.

Preferably, the porosity is between about 30 percent and about 50 percent and the pore size is between about 1 microns and about 10 microns. The metallic oxide can be between about 0.02 percent and about 10 percent by weight of the porous layer. Preferably, the metallic oxide surface deposit is between about 0.05 percent and about 1.0 percent by weight of said porous layer. In a particularly preferred embodiment, the metallic oxide surface deposit is about 0.25 percent by weight of the porous layer.

The metallic oxide can be $ZrO_2$, $CeO_2$, doped-$ZrO_2$, doped-$CeO_2$, $Y_2O_3$, $Al_2O_3$, $Cr_2O_3$, $MoO_3$, $Nb_2O_5$, $TiO_2$, $Ta_2O_5$, $SnO_2$, $La_{0.6}Sr_{0.4}Co_{0.2}Fe_{0.8}O_3$, $La_{0.8}Sr_{0.2}MnO_3$, $La_{0.8}Sr_{0.2}FeO_3$, $La_{0.8}Sr_{0.2}CrO_3$, or $La_{0.8}Sr_{0.2}CoO_3$. The metal or metal alloy is Ag, Au, Pd, Pt, Ni, Ru, Rh, Ir, or alloys thereof. In a preferred embodiment, the porous layer is composed of silver and zirconia or ceria. The porosity is between about 30 percent and about 50 percent and the pore size is between about 1 micron and about 10 microns.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
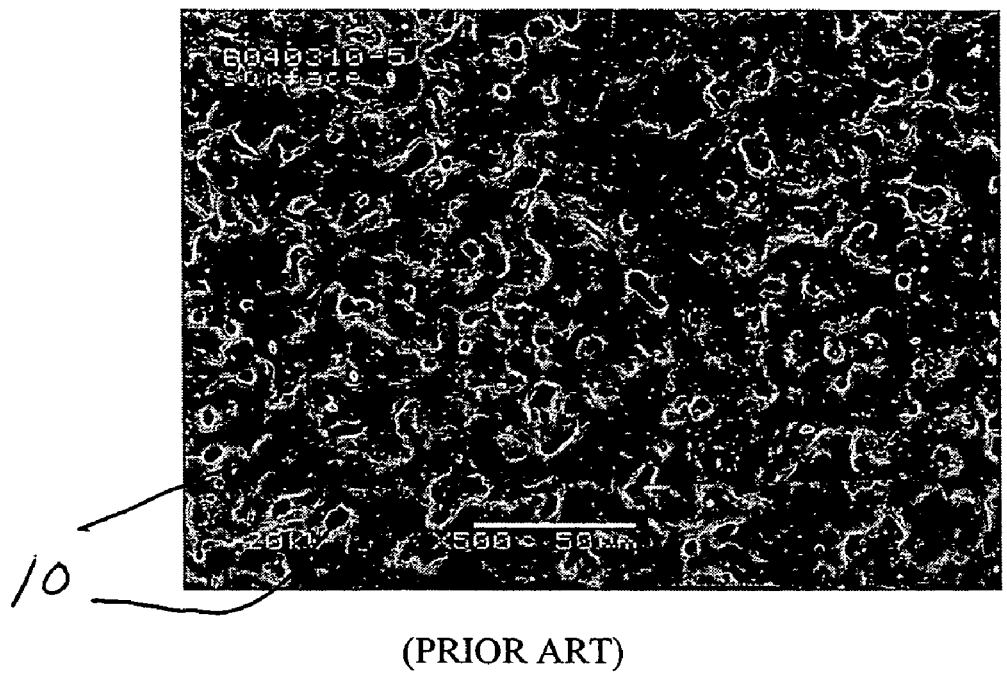
FIG. 1 is an electron micrograph of a surface of a partly sintered prior-art silver current collector applied to a coupon.

In accordance with a method of the present invention, a porous current collector is formed from a powder containing a metal or metal alloy having surface deposits of a metallic oxide. Such a powder can be produced by methods well known in the art, for example by wash-coating or mechanical alloying. For exemplary purposes, a silver powder, designated as FERRO S11000-02 powder, was obtained from Ferro Corporation, Electronic Material Systems, 3900 South Clinton Avenue, South Plainfield, N.J. 07080 USA. The size of particles contained in such powder is between about 3 and about 10 microns in diameter and the particles have a low specific surface are of about 0.2 $m^2$/gram. These features are preferred in that it is believed that they limit the driving force for sintering and densification. Zirconia surface deposits were formed on such powder such that the zirconia accounted for about 0.25 percent of the weight of the coated particle.

As may be appreciated, other electrical conducive metals and metal alloys can be utilized, such as Au, Pd, Pt, Ni, Ru, Rh, Ir and alloys of two or more of such elements. Furthermore, the metallic oxide, in addition to zirconia, can be $CeO_2$, doped-$ZrO_2$ (e.g. yttria stabilized zirconia—YSZ), doped-$CeO_2$ (e.g. gadolinia doped ceria—CGO), $Y_2O_3$, $Al_2O_3$, $Cr_2O_3$, $MoO_3$, $Nb_2O_5$, $TiO_2$, $Ta_2O_5$, $SnO_2$, $La_{0.6}Sr_{0.4}Co_{0.2}Fe_{0.8}O_3$, $La_{0.8}Sr_{0.2}MnO_3$, $La_{0.8}Sr_{0.2}FeO_3$, $La_{0.8}Sr_{0.2}CrO_3$, or $La_{0.8}Sr_{0.2}CoO_3$. Having said this, electrically conductive particles formed of silver and surface deposits of either zirconia or ceria constitute a preferred makeup.

While particle sizes for the metal or metal alloy can be greater than those noted above, preferably the particle sizes range from between about 0.1 microns and about 20 microns. Additionally, although 0.25 percent by weight is a particularly preferred content of the metallic oxide, greater amounts could be used provided that such amounts are not greater than the weight of metal or metal alloy used in forming the electrically conductive particles. In this regard, the metallic oxide content of the electrically conductive particles is preferably between about 0.02 percent and about 10.0 percent by weight. A more narrow range of the metallic oxide content of between about 0.05 percent and about 1.0 percent by weight is, however, more preferred. The aforesaid contents by weight will remain unchanged in the finished current collector layer in that after sintering the metal or metal alloy and the metal oxide utilized in forming such layer will be distributed through the layer.

Such powder can be applied to electrode surfaces of a sintered form of a layered structure containing an electrolyte and electrodes by way of slurry dipping application techniques. Other types of applications could be used such as aerosol applications, screen printing and tape casting. The slurry content is of course modified in a manner well known in the art to fit the particular type of application utilized. The sintered form can be produced by a variety of well known techniques such as extrusion, injection molding, isopressing and tape casting or a combination of such techniques. It is to be noted that it is possible that the layered structure be in an unsintered or green state. In such case, after application of the current collector layer to the electrodes, the coated structure would then be co fired to sinter the electrode layers, the electrolyte layer and the outer current collector layers.

In case of dip coating, a suitable slurry can be formed by known techniques such as by mixing the electrically conductive particles or powder with solvents, such as ethanol and toluene, a binder such as polyvinyl butyral and a plasticizer such as dibutyl phtalate. A dispersant, such as menhaden fish oil may optionally be mixed into the slurry. In case of the silver-coated particles obtained from Ferro Corporation as indicated above, the slurry can be made up in accordance with such manufacturer's recommendations, namely, mixing the conductive particles with FERRO B-7310 Tape Casting Binder System (available from Ferro Corporation set forth above), ethanol and toluene. The particles are between about 45 percent and about 75 percent by weight of the slurry. Additionally, the binder system is between about 20 percent and 50 percent by weight of the slurry, remainder equal parts of the ethanol and toluene. A preferred slurry is about 70 percent by weight of particles, 20 percent by weight of the binder system and remainder equal parts of the ethanol and toluene. Obviously, the lower the percentage of particles, the more times the form must be dipped to obtain a desired thickness. The layered structure can then be dipped into the slurry and then dried and heated to remove the solvent and burn out the organic component such as the binder and plasticizing agent. Further heating partially sinters the current collector layer and produces the necessary porous coherent structure.

The current collector layer formed in a manner outlined above, preferably is between about 5 microns and about 100 microns thick and has a porosity of between about 10 percent and about 70 percent. A porosity of between about 30 percent and about 50 percent is preferred. Pore sizes can be in a range of between about 0.1 micron and about 20 microns. A pore size range from between about 1 micron and about 10 microns is particularly preferred. As indicated above, pore size or more specifically, average pore diameter, is measured by known quantitative stereological line intersection analytical techniques. Although well known, a specific reference to such techniques and a description thereof can be found in Quantitative Stereology, by E. E. Underwood, Addison-Wesley Publishing Co., Reading Mass., (1970). It is to be noted that a content of electrically conductive parties of between about 45 percent by weight and about 75 percent by weight of the slurry is necessary to produce the aforesaid thickness range for the current collector.

For comparative purposes, current collectors were formed with the use of silver powder alone and silver powder having surface deposits of zirconia. In both cases, the silver powder was FERRO S11000-02 silver powder. The powder prepared in accordance with the present invention had zirconia surface deposits in an amount about equal to 0.25 percent of the weight of the coated particle.

Also, in both cases the silver powder alone and the silver powder with surface deposits of zirconia was applied to a sintered coupon by way of a slurry. The slurry contained about 49 percent by weight of the powder. The liquid component was added to a bottle followed by the powder. The mixture was then balled milled for at least 16 hours. The sintered coupon was formed of gadolinium doped ceria. The coupon was then coated with the slurry. The coated coupon was allowed to dry at ambient conditions and then sintered in air at a temperature of about 850° C. for one hour with heating and cooling rates of between about 3° C. per minute. The sintering temperature was selected to be above the intended operating temperature of about 700° C.

Figure 2:
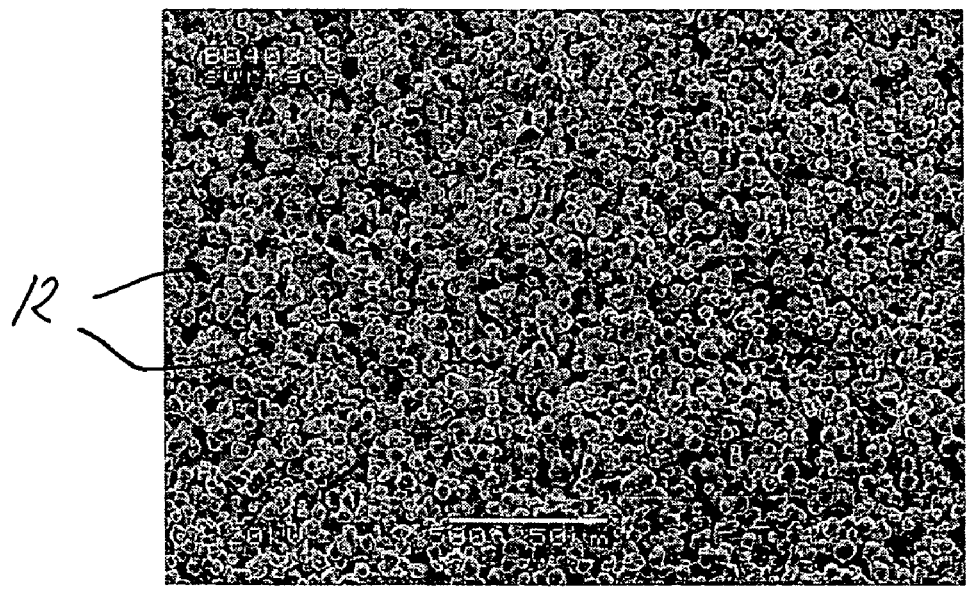
FIG. 2 is an electron micrograph of a surface of a partly sintered current collector applied to a coupon by a method in accordance with the present invention.

FIG. 1 illustrates a current collector formed from the silver powder alone and FIG. 2 show a current collector formed in accordance with a method of the present invention. The current collectors and electrodes of FIGS. 1 and 2 were formed in a manner outlined above and are in a state existing directly after sintering. The pores within FIGS. 1 and 2 are designated by reference numbers 10 and 12, respectively. Comparing FIGS. 1 and 2 it can be seen that the sintered coating of FIG. 2 is far more porous than the sintered coating of FIG. 1.

Figure 3:
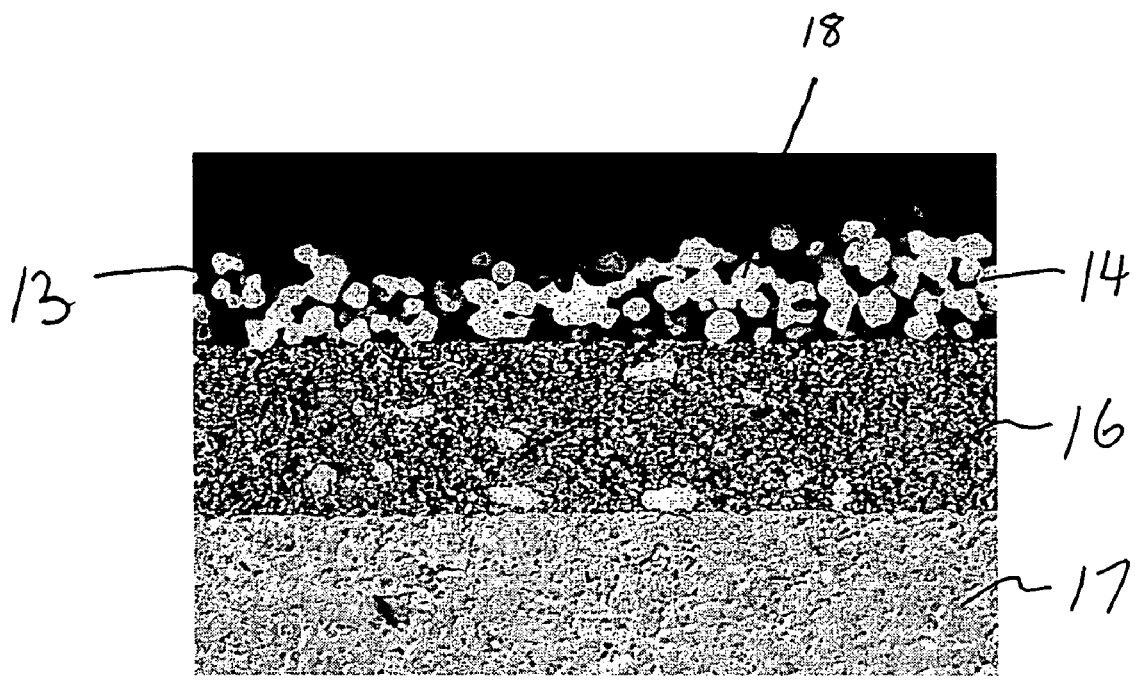
FIG. 3 is an electron micrograph of a section of a partly sintered current collector applied to an electrode by a method in accordance with the present invention.

With additional reference to FIG. 3, a current collector of the present invention is shown in connection with its application to layers of an electrochemical device. Such current collector is a porous layer designated by reference number 14 in contact with and affixed to an electrode layer 16. Electrode layer 16 is affixed to an electrolyte 17. The electrolyte layer 16 was formed from a mixture containing about 65 percent by weight of lanthanum strontium iron cobalt oxide, remainder gadolinium doped ceria. The electrode had a porosity of between about 25 percent and about 40 percent and a pore size of between about 0.5 and about 2.0 microns. Electrolyte 17 is gadolinium doped ceria. The porous layer 14 was applied in the same manner as for the coupon testing shown in FIGS. 1 and 2. After partial sintering pursuant to the same temperature and schedule of FIGS. 1 and 2, porous layer 14 has retained its granularity and is thus formed of a partially sintered mass of granular, electrically conductive particles 18 that have surface deposits of the zirconia metallic oxide and form pores 13.

Figure 4:
FIG. 4 is an electron micrograph of a surface of the partly sintered prior-art current collector previously illustrated in FIG. 1 after having been heated for ten hours at about 850° C.
Figure 5:
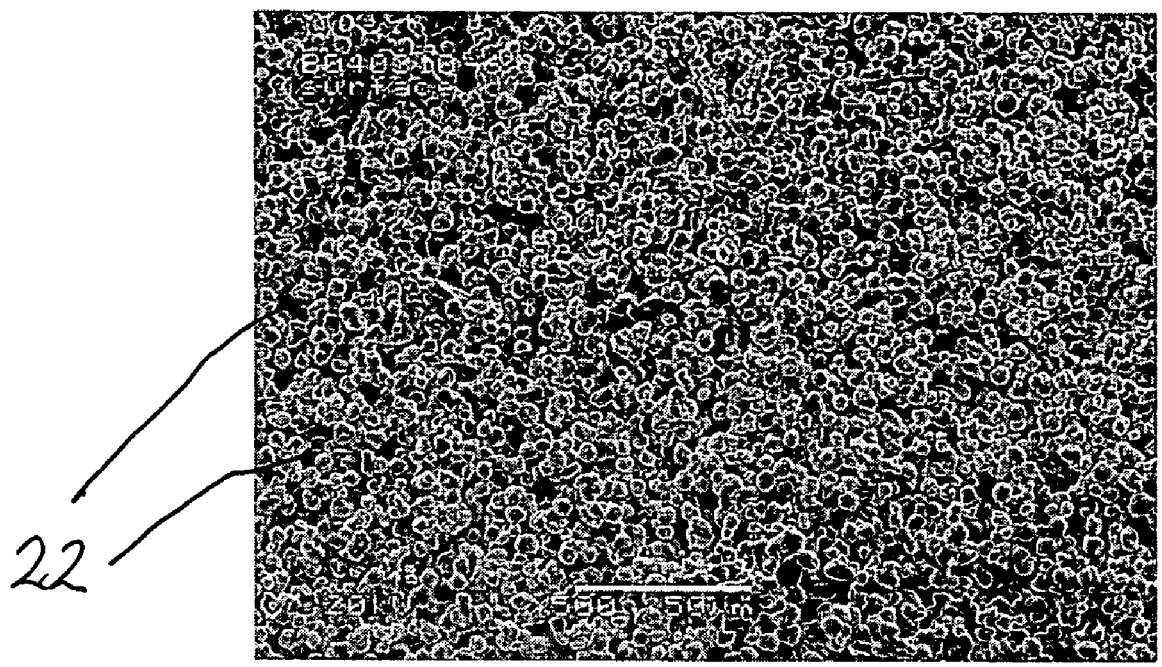
FIG. 5 is an electron micrograph of a surface of a partly sintered current collector of the present invention and previously illustrated in FIG. 2 after having been heated for ten hours at about 850° C.

With reference to FIGS. 4 and 5, the samples shown in FIGS. 1 and 2, respectively, are further illustrated after having been heated for ten hours at 850° C. This temperature is higher than the normal operating temperatures encountered for electrochemical air separation devices and was selected to simulate long term usage and aging. As can be seen in the figures, the silver alone current collector layer (FIG. 4) had virtually no porosity while the current collector layer formed in accordance with the present invention (FIG. 5) changed very little as compared with its structure shown in FIG. 2. Pores within FIGS. 4 and 5 are designated by reference numbers 20 and 22, respectively.

It is to be noted that although the FIG. 2 coating was less conductive than silver alone acceptable conductivities were obtained. In this regard, the coupon coated with silver alone exhibited a conductivity of about 450,000 Siemens/cm at 25° C. and about 80,000 Siemens/cm at 700° C. The sample prepared in accordance with the present invention, which is the sample formed from the powder having the zirconia deposits, had a conductivity of about 125,000 Siemens/cm at 25° C. and about 42,000 Siemens/cm at 700° C. Furthermore the conductivity of the FIG. 2 sample remained constant over one week while being maintained at a temperature of about 700° C., indicating no further densification of the current conductor layer.

It was further found that a current collector layer formed in a manner of the present invention (FIG. 2) exhibit improved adhesion characteristics over prior art current collectors such as formed by silver alone (FIG. 1). These tests were conducted according to ASTM standard D3359-02 Standard Test Methods for Measuring Adhesion by Tape Test.

While the present invention has been described with reference to a preferred embodiment, as will occur to those skilled in the art, numerous, changes, additions and omissions may be made without departing from the spirit and the scope of the present invention.

We claim:

1. A current collector to conduct an electrical current from or to an electrode layer of an electrochemical device said current collector comprising:

a porous layer in contact with and affixed to said electrode layer, said electrode layer capable of conducting electrons produced in connection with oxygen ion transport through an electrolyte of the electrochemical device at elevated temperatures, said porous layer formed of a partially sintered mass of granular, electrically conductive particles, each said electrically conductive particles composed of a metal or metal alloy having surface deposits of a metallic oxide, the surface deposits of the metallic oxide constituting a lower weight percentage of the electrically conductive particles than the metal or metal alloy; and said porous layer being between about 5 microns and about 100 microns thick and having a porosity of between about 10 percent and about 70 percent and pores having a pore size of between about 0.1 microns and about 20 microns.

2. The current collector of claim 1, wherein:

the porosity is between about 30 percent and about 50 percent; and the pore size is between about 1 microns and about 10 microns.

3. The current collector of claim 1, wherein the metallic oxide is between about 0.02 percent and about 10 percent by weight of the porous layer.

4. The current collector of claim 1, wherein said metallic oxide surface deposit is between about 0.05 percent and about 1.0 percent by weight of said porous layer.

5. The current collector of claim 1, wherein said metallic oxide surface deposit is about 0.25 percent by weight of said porous layer.

6. The current collector of claim 1, wherein:

the metallic oxide is $ZrO_2$, $CeO_2$, doped-$ZrO_2$, doped-$CeO_2$, $Y_2O_3$, $Al_2O_3$, $Cr_2O_3$, $MoO_3$, $Nb_2O_5$, $TiO_2$, $Ta_2O_5$, $SnO_2$, $La_{0.6}Sr_{0.4}Co_{0.2}Fe_{0.8}O_3$, $La_{0.8}Sr_{0.2}MnO_3$, $La_{0.8}Sr_{0.2}FeO_3$, $La_{0.8}Sr_{0.2}CrO_3$, or $La_{0.8}Sr_{0.2}CoO_3$; and the metal or metal alloy is Ag, Au, Pd, Pt, Ni, Ru, Rh, Ir, or alloys thereof.

7. The current collector of claim 6, wherein:

the porous layer is composed of silver and zirconia or ceria;

the porosity is between about 30 percent and about 50 percent; and the pore size is between about 1 microns and about 10 microns.

* * * * *